(12) United States Patent
Frank et al.

(10) Patent No.: US 11,271,990 B2
(45) Date of Patent: Mar. 8, 2022

(54) ALLOCATION OF DIGITAL RESOURCES WITHIN A LOCAL, MODULAR COMPUTER NETWORK (EDGE CLOUD)

(71) Applicant: SIEMENS AKTIENGESELLSCHAFT, Munich (DE)

(72) Inventors: Reinhard Frank, Munich (DE); Hans-Peter Huth, Munich (DE); Florian Zeiger, Höhenkirchen-Siegertsbrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 290 days.

(21) Appl. No.: 16/611,782

(22) PCT Filed: May 7, 2018

(86) PCT No.: PCT/EP2018/061714
§ 371 (c)(1),
(2) Date: Nov. 7, 2019

(87) PCT Pub. No.: WO2018/206502
PCT Pub. Date: Nov. 15, 2018

(65) Prior Publication Data
US 2020/0204611 A1     Jun. 25, 2020

(30) Foreign Application Priority Data

May 10, 2017   (DE) .......................... 102017207918.5
Aug. 22, 2017  (DE) .......................... 102017214655.9

(51) Int. Cl.
*H04L 29/08*      (2006.01)
*G06F 8/61*       (2018.01)
(Continued)

(52) U.S. Cl.
CPC ................ *H04L 67/10* (2013.01); *G06F 8/63* (2013.01); *H04L 41/0893* (2013.01);
(Continued)

(58) Field of Classification Search
CPC ......... H04L 67/10; H04L 67/34; H04L 41/12; H04L 41/0893; H04L 41/0896; G06F 8/63
See application file for complete search history.

(56) References Cited

U.S. PATENT DOCUMENTS 7,321,583 B2 *  1/2008  Hahn .................. H04L 47/2491
                                                    370/349
2005/0188088 A1   8/2005  Fellenstein
                          (Continued)

FOREIGN PATENT DOCUMENTS

CN    102681899 A      9/2012
WO    WO2017070545 A1  4/2017

OTHER PUBLICATIONS

Communication of the Transmission of the International Provisional Report on Patentability for corresponding PCT/EP2018/061714 dated Jul. 26, 2019.
(Continued)

*Primary Examiner* — Minh Chau Nguyen
(74) *Attorney, Agent, or Firm* — Lempia Summerfield Katz LLC

(57) ABSTRACT

The disclosure relates to a method for allocating at least one digital resource of a local, modular computer network. The computer network has at least two computing modules. Each of the computing modules is assigned a resource value for a digital resource. In accordance with a resource request having a demand value, at least one of the digital resources is allocated to the request. The demand value is compared with at least one of the resource values. The method acts and the associated algorithms may be stored in particular in an image file. Because of the high flexibility of the method, mobile computing modules, etc., may also be integrated into the local, modular computer network. The computer network thus exhibits the modular and flexible character of the (Continued)

computer network. The computer network is not configured as a fixed structure, but rather may also dynamically expand and contract.

13 Claims, 2 Drawing Sheets

(51) Int. Cl.
  *H04L 12/24* (2006.01)
  *H04L 67/10* (2022.01)
  *H04L 41/0893* (2022.01)
  *H04L 41/0896* (2022.01)
  *H04L 41/12* (2022.01)
  *H04L 67/00* (2022.01)

(52) U.S. Cl.
  CPC .......... *H04L 41/0896* (2013.01); *H04L 41/12* (2013.01); *H04L 67/34* (2013.01)

(56) References Cited

U.S. PATENT DOCUMENTS

| | | | |
|---|---|---|---|
| 2010/0323657 A1* | 12/2010 | Barnard | H04W 8/20 455/404.1 |
| 2012/0254400 A1 | 10/2012 | Iyengar | |
| 2014/0192717 A1 | 7/2014 | Liu | |
| 2014/0194101 A1* | 7/2014 | Mullen | H04M 1/72457 455/418 |
| 2017/0364164 A1* | 12/2017 | Kim | G06F 3/03545 |

OTHER PUBLICATIONS

ETSI, MECISG. "Mobile edge computing (mec); framework and reference architecture." ETSI, DGS MEC 3 (2016). pp. 1-18.

Kochar, Vrinda, and Arnab Sarkar. "Real time resource allocation on a dynamic two level symbiotic fog architecture." 2016 Sixth International Symposium on Embedded Computing and System Design (ISED). IEEE, 2016. pp. 49-55.

Benkhelifa, Elhadj, et al. "GA-based resource augmentation negotation for energy-optimised mobile ad-hoc cloud." 2016 4th IEEE International Conference on Mobile Cloud Computing, Services, and Engineering (MobileCloud). IEEE, 2016. pp. 110-116.

German Research Report for German Application No. 10 2017 214 655.9, dated Jun. 6, 2018.

Hegyi, Attila, et al. "Application orchestration in mobile edge cloud: placing of iot applications to the edge." 2016 IEEE 1st International Workshops on Foundations and Applications of Self* Systems (FAS* W). IEEE, 2016. pp. 230-235.

Li, Zhe, and Jean-Charles Point. "COAST: A connected open platform for smart objects." 2015 2nd International Conference on Information and Communication Technologies for Disaster Management (ICT-DM). IEEE, 2015. pp. 166-172.

PCT International Examination Report and Written Opinion of International Examination Authority dated Jul. 26, 2019 corresponding to PCT International Application No. PCT/EP2018/061714 filed May 7, 2018.

Ryden, Mathew, et al. "Nebula: Distributed edge cloud for data intensive computing." 2014 IEEE International Conference on Cloud Engineering. IEEE, 2014. pp. 57-66.

Chinese Office Action for Chinese Application No. 201880046197.9 dated Jan. 4, 2022.

* cited by examiner

ALLOCATION OF DIGITAL RESOURCES WITHIN A LOCAL, MODULAR COMPUTER NETWORK (EDGE CLOUD)

The present patent document is a § 371 nationalization of PCT Application Serial No. PCT/EP2018/061714, filed May 7, 2018, designating the United States, which is hereby incorporated by reference, and this patent document also claims the benefit of German Patent Application No. 10 2017 207 918.5, filed May 10, 2017, and German Patent Application No. 10 2017 214 655.9, filed Aug. 22, 2017, which are also hereby incorporated by reference.

TECHNICAL FIELD

The present disclosure relates to a method for allocating at least one digital resource of a local, modular computer network that has at least two computer modules to each of which a resource value for a digital resource is assigned, depending on a dataset that has a resource request having a required value, by way of a control unit.

BACKGROUND

The term "industrial edge cloud" is gaining in significance in the press and on the Internet. The term industrial edge cloud, in the context of the present disclosure, denotes a local, modular computer network. However, this term is not clearly defined. The various descriptions with regard to the local, modular computer network have the common feature that it is part of a computer network that is arranged close to the user. Particular services may be retained in situ and the local, modular computer network may provide an improved performance in terms of data processing. This local, modular computer network may provide limited access to sensors and actuators and be jointly incorporated in the case of security concepts. A local, modular computer network may be used industrially or commercially.

Particular services may be assigned to defined groups of people in such a network. Thus, for example, only employees in a logistics division are able to access position monitoring that may contain the local, modular computer network. In the normal case, a local, modular computer network is set up on a server that is arranged in the vicinity of the control processes and the associated devices. Thus, for example, a 3D printer may be arranged in a factory hall and an associated local, modular computer network may be arranged in closer surroundings of the 3D printer. Defining local, modular computer networks with regard to their size or spatial extent is relatively difficult. A local network is a network that may connect various devices within a defined region. In this context, the term "devices" means computer modules. In this case, the network may operate without IP routing, for example, only with Ethernet. The local network is defined by the number of devices connected thereto. There is specifically no generally recognized limit value to define a local network. In the industrial context, several hundred computer modules may be connected to a local network. These devices may be arranged locally, as a result of which a spatial limit may likewise occur. A local network may be restricted to a company premises or an office complex.

The IT infrastructure on a company premises may be combined to form a local, modular computer network. In the case of relatively large companies, such a company premises may have an overall extent of a few kilometers. A local, modular computer network is not however able to extend over several continents. Although a company may have a branch in Rome and another branch in Tokyo, the local, modular computer network would be restricted in each case to one location. Although it may be possible to connect two local modular computer networks, this does not mean that a single edge cloud results therefrom.

The local networks used up until now use homogeneous computer modules for the implementation thereof. Homogeneous computer modules are similar to one another and match in terms of one or more characterizing properties. Such networks may be marketed as a complete package by a provider, which, for example, leads to a situation whereby all of the computer modules may have the same operating system. In contrast thereto, the present application also makes it possible to form a local, modular computer network that may have heterogeneous components. Furthermore, a computer network according to this application is able to be adjusted in a considerably more flexible manner than a stationary computer network. A few deficits additionally occur in current edge cloud solutions.

Document US 2005/0188088 A1 describes a method for managing increasing resource requirements of a request in a network. For this purpose, the resources may be divided into discrete units that have a hierarchy. A performance capability of a first selection of resources is compared with a required performance capability for the request. If the performance capability is insufficient, the discrete resources are asked to achieve the performance capability.

The article "Real Time Resource Allocation on a Dynamic Two Level Symbiotic Fog Architecture" by Vrinda Kochar et al. from the journal "Sixth International Symposium on Embedded Computing and System Design" (ISED) from the year 2016 describes an approach of what is known as "fog computing", by way of which local devices are able to be used instead of a cloud. These "edge devices" may be dynamically added to this allocation system and leave the allocation system again after they have performed their computational task. This article describes how it is possible to create a schedule by way of which it is defined when which device is intended to execute which task.

The magazine "Mobile Edge Computing (MEC); Framework and Reference Architecture" describes a mobile edge architecture that is intended to allow applications to be executed efficiently and seamlessly. This article describes functional elements and reference points between these elements and a number of mobile edge services that contain this solution.

Document US 2012/0254400 A1 describes a method for operating a computer center. For this purpose, components are monitored in order to record individual heterogeneous operating parameters of computing clouds within the computer center. This document contains a dedicated controller that regulates the individual heterogeneous computing clouds and controls the air conditioning in the computer center. This is performed depending on the monitored components in order to improve the performance capability of the computer center.

Different application cases or various usage locations require an even more flexible concept with the ability to at least partly adjust the requirements. In a stationary computer network, this is for the first time not the case. Application cases that occur on a temporary basis may require a temporary installation or dynamic infrastructures. A high degree of user-friendliness, in one case installation-free use of software and further components, is therefore expedient. Required adaptations to the local, modular computer network may, in one case, also be possible for laypeople and not just for network experts. A few scenarios in which an offline execution is desirable are conceivable. In these cases as well, particular computer modules that are part of the local, modular computer network may be able to continue their work. The work of the computer modules may not be dependent on an online connection. In many cases, a plurality of participants shares a network and the associated IT infrastructure. These participants may be humans, but also the computer modules as part of the local, modular computer network. Particular requirements require an increased computational capacity. The local, modular computer network may be configured in a flexible manner so as to be able to respond appropriately to computationally intensive requests. With regard to flexibility, it may also be expedient for the local, modular computer network also to support devices and software from different manufacturers.

SUMMARY AND DESCRIPTION

The abovementioned deficits show that local, modular computer networks that exist at the present time are not able to respond, or are able to respond only insufficiently, to various application cases or requirements. Therefore, an object of the present disclosure is for providing a local, modular computer network that is able to respond flexibly to different requirements. In this case, the focus is not on the creation of a local, modular computer network, but rather on the adaptability and flexibility of existing networks that have heterogeneous components or computer modules. Such a system of heterogeneous computer modules is intended to be optimally configured to the requirements by way of this present disclosure.

The present disclosure describes a method for allocating at least one digital resource of a local, modular computer network that has at least two computer modules to each of which a resource value for a digital resource is assigned, depending on an input dataset that has a resource request having a required value, by way of a control unit that executes the following method acts. The control unit first of all accesses the input dataset and reads the input dataset. The control unit retrieves the resource value from each computer module that is part of the local, modular computer network, wherein the resource value represents an available proportion of the digital resource of the respective computer module. The control unit compares the required value with at least one of the retrieved resource values. The control unit allocates at least one of the digital resources to the request depending on a result of the comparison. In a further act, a mobile computer module is integrated automatically into the local, modular computer network if the computer module enters a spatial area. The mobile computer module is automatically removed if the computer module leaves the spatial area.

The respective computer modules may have or perform individual functions. The respective computer modules may be arranged within a working area in order to perform their respectively assigned tasks. The term working area may have two meanings in this connection. The working area may be spatially defined, that is to say a computer module may be assigned to a particular factory hall or a room, on the one hand. The working area may relate to a particular task or a function, on the other hand. A computer module may have been fixedly assigned to particular functions. It is however also possible for a computer module to be assigned new functions. In the normal case, the computer modules are executed separately from one another. This means that no communication may be provided between computer modules. Different computer modules are thus not able to influence one another. A working area of a computer module may have further functions or components that are made available for the respective computer module in the respective working area. These components or functions may include sensors, actuators, interfaces to industrial protocols (e.g., industrial protocol daemons), or various software applications.

The term "digital resource" or "digital resources" is understood in particular to mean storage capacity, computational capacity, computational power, and communication capabilities. These digital resources are detected in a local, modular computer network by the method acts and distributed within the local, modular computer network in accordance with the resource request. The method acts in particular describe how very different resources, (for example, the computational power of a server and that of a small industrial controller), are able to be configured as a uniformly managed resource pool. This does not involve regenerating or supplementing a local, modular computer network by providing new computer modules, for example, PCs.

This rather involves detecting already existing computer modules and their resource values. These resource values are compared with the required value that represents the resource request, containing the respective resource value of the resource modules. Using various resource requests, it is accordingly possible to change the assignment of the digital resources within the local, modular computer network. These changes may be configured in a flexible manner, and it is thereby possible to provide an intelligent local, modular computer network. If, for example, an extremely computationally intensive data processing operation is started, then the method would not necessarily perform the task on the computer module in which the resource request was made. The digital resources within the local, modular computer network would be determined and compared with the required value, in this case, the computationally intensive data evaluation operation. This comparison may arrive at the result that another computer module within the local, modular computer network that is able to provide more computational power for this task is available. The required value of the resource request may be a time specification within which the computationally intensive data evaluation operation is intended to take place. In this case, the digital resource values would be converted into time values, which may then be compared with the required value. In this example, the different computer modules would give different time values that the computer modules would require in order to be able to satisfy the requirement. A comparison with the required value, in this case a time specification, would indicate which computer modules within the local, modular computer network are able to perform this task in the predefined time. This may possibly be a computer module different from the one that made the request. The method is not limited to the respective computer modules in that the computer modules are checked on their own. It is also possible to divide the resource request and to apply different or several computer modules in order to perform the task. Such a case would result in a more complex comparison algorithm than in the abovementioned simpler example.

It is therefore possible to generate a local, modular computer network from existing computer modules that is able to be scaled up or scaled down automatically depending on the resource request. That is to say, when a new additional task arises within such a network and requires additional digital resources, then the local, modular computer network is able to adjust thereto or respond thereto in a flexible manner. This may be achieved using a more complex comparison algorithm.

In one advantageous further embodiment, there is provision for the individual method acts to be stored in a digital image file and for the method to be executed automatically following activation of the image file by the control unit. This image file may be a binary file or a compressed archive that contain the required information. The image file may store basic functions that are required for a plurality of services, such as an authentication function with regard to the respective computer modules.

This image file may be booted on conventional computers with associated operating systems as an executable boot file. That is to say, the image file may be executed as what is known as an ISO image. If an image file is used, then the control unit uses this image file. The control unit may also be considered to be a monitoring unit. The control unit has information about all of the computer modules, including their capabilities, in particular, their digital resources. Using the control unit, a network structure and the individual capabilities thereof are able to be determined. That is to say, the control unit may detect the respective computer modules and thus detect the structure of the local, modular computer network. The control unit is able to set the method in motion by executing the image file. Various comparison or assignment algorithms may be stored in the image file. These algorithms may influence the allocation of the digital resources depending on the required value. The assignment or comparison algorithms may in this case be configured to be more or less complex.

In a further variant, the image file is created outside the local, modular computer network without using the control unit. It is therefore not necessary to use the control unit to modify or to improve the algorithms stored in the image file. Although the control unit needs it to ultimately set the method in motion, the image file that contains the method may also be changed on another computer module or another computer. It is therefore possible to influence the process of allocating digital resources within the local, modular computer network outside the computer network as well. A software company may be tasked with modifying or with improving the image file.

In a further embodiment, a method is provided where the created image file is made available to the control unit and the image file is executed within the local, modular computer network. If the image file has been modified externally, as described in the above paragraph, then the changed image file may be transmitted to the control unit, which is able to take into account the new image file when the method is executed. In this case, the image file may be made available to the control unit in various ways. A data transfer by way of a data carrier (for example, CD-ROM, USB stick) would be conceivable, or the control unit may be controlled remotely via a further PC that does not have to be part of the computer network. Depending on a requirement or security rules, remote access to the control unit may be possible or ruled out.

It is also possible for the control unit to access a further computer module that does not have to be part of the modular, local computer network. An image file may be stored on this further computer module, (for example, a PC), which image file is accessed by the control unit and then executed thereby within the local, modular computer network. It is thereby possible to integrate services where required into the modular, local computer network and execute them therein via a remote connection. The local, modular computer network may initially be booted with a minimum number of services and integrate further services into the computer network via additional image files only when required. This may be configured such that it is possible to integrate additional image files during operation. The concept of OpenStack software or script-based SSH or FTP services may be used to implement the image files or the associated services. In this case, the OpenStack software would be the tool that the image file makes available to the local, modular computer network.

In a further variant, there is provision for the computer modules to be activated individually by the control unit and for no signals that relate to the available proportions of the digital resources to be exchanged between the computer modules. In many cases, there is provision for the respective computer modules not to be able to exchange any signals with one another within the local, modular computer network. The computer modules may be activated separately in this variant. A situation whereby the computer modules negatively influence one another is thus able to be avoided. If, for example, a robot, which may represent a computer module, receives an activation signal, then this robot may not forward the activation signal to further computer modules. A communication connection to the control unit may be set up in order to activate the computer modules. The respective computer modules may each have a communication connection to the control unit in this embodiment, but no signals are exchanged among the respective computer modules.

In one advantageous further embodiment, there is provision for the control unit to execute the method in accordance with a provided policy that includes in particular a schedule for executing method acts a) to d). There may thus be provision for the local, modular computer network to be switched into what is known as a standby mode at particular times. Such a time interval may be the time interval of a company holiday. There may also be provision to keep particular digital resources ready at particular times in order to absorb possible working peaks that require more digital resources than normal. The policy may describe a schedule, but other policies are also conceivable. The execution of the method by the control unit may thus also be dependent on non-temporal parameters.

The present disclosure also provides a device for allocating digital resources of a local, modular computer network that has at least two computer modules to each of which a resource value for a digital resource is assigned, depending on an input dataset that has a resource request having a required value, by way of a control unit. The control unit is in this case configured to access the input dataset and to read the input dataset. The device is distinguished in that the control unit is configured to retrieve the resource value from each computer module that is part of the local, modular computer network, wherein the resource value represents an available proportion of the digital resource of the respective computer module. The control unit is furthermore configured to compare the required value with at least one of the retrieved resource values and to allocate at least one of the digital resources to the request depending on a result of the comparison. The advantages cited in connection with the method apply analogously to this associated device as well.

One advantageous variant of makes provision for the at least two computer modules to form a heterogeneous computer network. A heterogeneous computer network has a plurality of computer modules that differ from one another in terms of at least one characterizing property. The heterogeneous computer modules may in particular be formed from nonidentical units. One computer module may thus be configured as a desktop PC and another computer module as a robot. The various computer modules may form a local computer network. The computer modules may have different transmission methods or have a different topological construction. One transmission method may thus provide an encrypted data transmission, another data transmission may be restricted just to surroundings of a few meters around the computer module (for example, Bluetooth), or the transmission type may provide for a data transmission between computer modules that are more than 10 meters apart. Data transmission by way of satellite communication to computer modules that are even further apart is also conceivable.

Transmission media within one computer module may differ from those of another computer module. One computer module may have coaxial cables and another may have TP twisted pair cables as transmission media. Such transmission media may physically connect various computer modules, and two computer modules may accordingly be connected to one another by a cable. If a plurality of cable connections is used, then the type of the cable may be different. Different operating systems for the respective computer modules are also possible. With regard to the topology, heterogeneous local networks may be constructed in a bus, star, or ring topology. Further aspects of the heterogeneous network may be implemented by way of different network configurations or access methods of the computer modules.

There are thus many possibilities as to how the computer modules are able to form a heterogeneous computer network. By virtue of their different characterizing properties, these computer modules may form a heterogeneous pool of digital resources. This may be referred to as a heterogeneous resource pool. This resource pool may therefore have different digital resources. This may not be a uniform resource that is configured identically or similarly, (e.g., a server rack), but rather, e.g., various devices, the computer modules, form a heterogeneous network having respectively specific capabilities. If their digital resources are different, the heterogeneous computer network likewise has a heterogeneous resource pool.

The local, modular computer network may be configured as a heterogeneous network. By way of example, there are computer modules that support a particular type of communication as digital resource, for example, ProfiNet. Other computer modules may execute calculations in real time, they may thus be "real-time capable", and the calculations required in the automation are therefore used under real-time conditions. Such computer modules may offer computational power as a digital resource. Further computer modules may keep storage capacity ready as a digital resource. Other devices as computer modules are very well suited to database queries. Or there may be a computer module within the heterogeneous network, wherein the computer module serves as a gateway between communication technologies (for example, gateway between iWLAN (industrial wireless local area network—a development of WLAN for the punctual transmission of datasets), Ethernet, satellite communication, etc.).

The disclosure makes provision for the control unit to be configured to automatically integrate a mobile computer module into the local, modular computer network if the computer module enters a spatial area and to remove it if the computer module leaves the spatial area. A mobile computer module may be a movable robot. Smartphones, which are transported by people from one spatial area to another spatial area, may also be considered to be mobile computer modules. A larger computer module, such as a ship, may likewise be classified as a mobile computer module. Because mobile computer modules are movable, they may leave the area of influence of the local, modular computer network or enter this area.

That is to say, in this variant, the local, modular computer network is defined as not being stationary in terms of the type and number of respective computer modules. If, for example, the local, modular computer network includes part of a harbor, then an incoming ship represents a mobile computer module. This mobile computer module, in this case the ship, would come into the area of influence of the local, modular computer network by entering the harbor. The control unit of the local, modular computer network may register this ship and integrate its respective computer modules in the modular, local computer network. The digital resources would thereby be increased, which may be of importance when allocating the digital resources. If the ship has, for example, a large number of powerful computers, then computationally intensive tasks may temporarily be exported to the ship. When the mobile computer module leaves the area of influence of the local, modular computer network again, it is logged out of the computer network and removed therefrom by the control unit. In this variant, the local, modular computer network may fluctuate in terms of its computer modules and the capacities thereof. Stated in simple terms, the local, modular computer network may be configured so as to "breathe" in this variant.

In a further variant, there is provision for a plurality of computer modules to be arranged in a spatial area that is assigned to the local, modular computer network. Such a spatial area may be a factory hall. This may contain a plurality of computer modules, for example, robots. It is thereby possible to divide the local, modular computer network into various spatial areas and to assign the respective computer modules to a spatial area. This may be highly beneficial under some circumstances when possibly searching for errors.

In a further advantageous embodiment, there is provision for the computer modules each to have an interface for communicating with one or more computer modules. In this variant, computer modules may also exchange signals with one another. Particular communication channels that allow certain signals or parameters to be able to be exchanged directly between computer modules may thus be created between the computer modules. A computer module that is executing a temperature-dependent process may communicate with another computer module that is able to read a temperature sensor.

A further advantageous variant makes provision for the computer module to be coupled to a sensor unit via a communication connection, wherein the sensor unit is configured to record a surroundings parameter. Such a sensor unit may be a camera or a temperature sensor. The temperature sensor may record the temperature in its surroundings, and the camera unit may record and store images or photos in its surroundings. These surroundings parameters may be made available to the control unit via the communication connection.

In a further embodiment, there is provision for the control unit to be configured to allocate the at least one digital resource depending on the surroundings parameter. If, for example, the camera unit establishes that a truck containing a delivery enters a factory premises, then the control unit may provide those computer modules that relate to logistics and goods reception with additional digital resources. It is also possible to allocate the digital resources depending on a temperature. In the case of a relatively high temperature, the effectiveness of computer modules may be reduced, which necessitates reallocation of the digital resources within the local, modular computer network. The method may thus be performed depending on a surroundings parameter.

In a further embodiment, there is provision for the local, modular computer network to have an at least partly wired communication connection to a further external control unit. This external control unit may thus be placed outside the local, modular computer network. The external control unit may be part of a remote system, which may be referred to as a "backend system". It is thereby possible to set up or to control the local, modular computer network remotely via the external control unit. This remote system and the local, modular computer network are in this case may be connected via a LAN network or a WAN network. A combination of LAN and WAN networks is also possible in order to connect the backend system to the local, modular computer network.

BRIEF DESCRIPTION OF THE DRAWINGS

The present disclosure is now explained in more detail with reference to the appended figures, in which.

DETAILED DESCRIPTION

Figure 1:
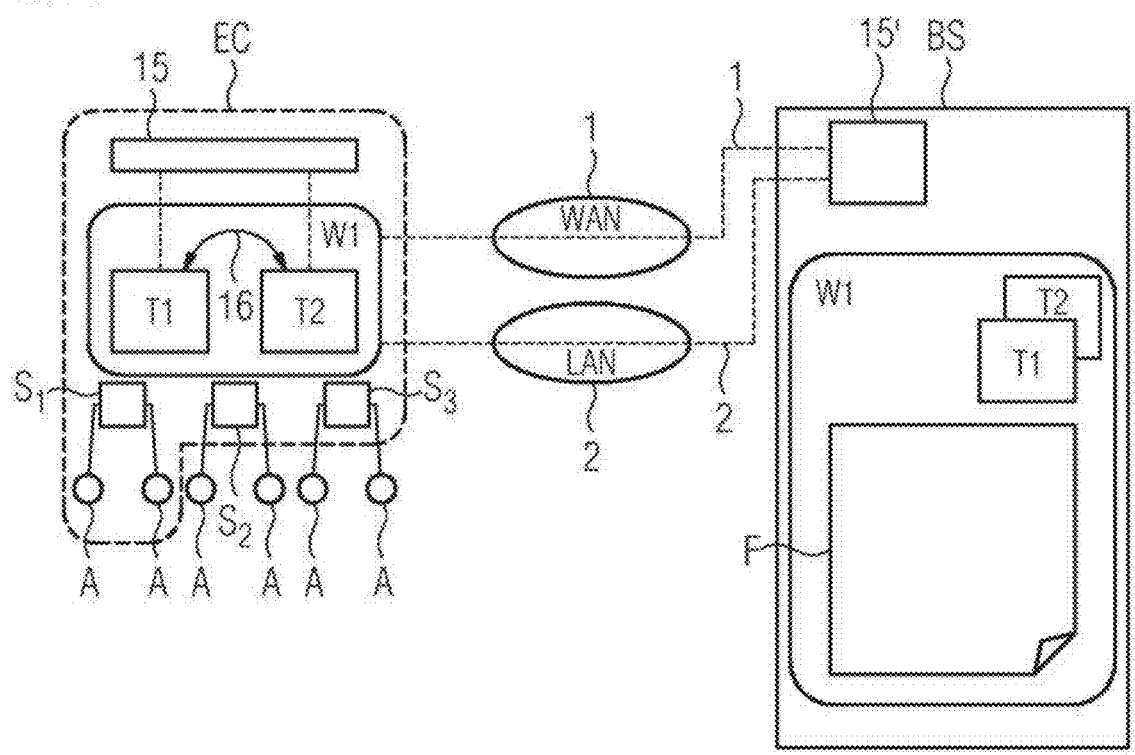
FIG. 1 depicts an example of a basic sketch of a local, modular computer network having the associated components, and an external control unit in a backend system.

FIG. 1 schematically shows a local, modular computer network EC that has two computer modules T1 and T2 in a working area W1. In this example, the computer module T1 has a communication connection to the sensor S1. Communication services on the industrial scale may require a direct connection, and may require particular standards. The communication connection may be defined by the EtherCAT or Profinet standard. In this case, this means that the computer modules T1 and T2 are not able to be arranged as desired with respect to the local, modular computer network EC. That is to say, the local, modular computer network EC may be arranged in the vicinity of the computer modules T1 or T2 in question. The local, modular computer network EC may be arranged in the same building as the associated computer modules T1 and T2. The local, modular computer network EC is currently known primarily by English terms. The local, modular computer network EC may be referred to using the term "industrial edge cloud" or "edge computing". The working area W1 in this example of FIG. 1 includes the computer modules T1 and T2. These computer modules in turn have a communication connection to the sensors S1, S2 or S3 that are assigned thereto. The associated actuators A are able to be activated by the computer modules T1, T2 via these communication connections.

The working area W1 may be defined spatially or be predefined by other properties. Thus, for example, those computer modules that are intended to perform the same task may be combined to form a working area. The computer modules T1 and T2 may for their part execute or perform predefined functions F. Such functions F may be industrial applications, authentications, constructing a company-internal communication connection, etc. They may exchange particular signals with one another in a predefined context. The computer modules T1 and T2 are able to recognize one another using an authentication function. The computer modules T1 and T2 may be used for certain data processing operations. It is thus possible for digital resources 10, 11, 14 to be used in the context of a production management system. The computer modules T1 and T2 may likewise execute tasks that have been allocated thereto by a control unit 15 or external control unit 15'.

The digital resources 10, 11, 14 are allocated in this case by the control unit 15 or the external control unit 15'. The control unit 15 may access an image file in which method acts are stored. Different and complex comparison or allocation algorithms may in this case be stored in the image file.

FIG. 1 additionally shows a remote-control system, which may also be referred to as a backend system BS. This backend system BS is optional but may be desirable in order to configure the local, modular computer network EC by way of the further external control unit 15'. The external control unit 15' is arranged within the backend system BS. The working area W1 having the computer modules T1 and T2 may be depicted in the backend system BS. The backend system BS may be connected to the local, modular computer network EC by a wide area network connection 1 (WAN connection) or a LAN connection 2. These two connections may be wired. In the area of the backend system BS, the working area W1 is to be considered as a virtual working environment that makes it possible to access various functions F of the computer modules T1 and T2. The working area W1 within the local, modular computer network EC is by contrast to be understood to be a spatial working area. The sensors and actuators may be connected to the associated computer modules T1 and T2 via specific interfaces. The computer modules T1 and T2 are normally activated individually by the control unit 15 or the external control unit 15'. However, there may be provision for an internal communication connection 16 to be provided between the computer modules T1 and T2. A predefined communication may take place between the two computer modules T1 and T2 via this internal communication connection 16. If this is not desirable, then the internal communication connection 16 may simply be dispensed with.

The sensors S1, S2, S3 and the associated actuators A may be arranged in the vicinity of the computer modules T1 and T2. This is highly advantageous especially in the case of a programmable logic controller (PLC), because a rapid transmission of data is extremely important in this case. In this case, the same argument applies to the control unit 15. If, for example, a manufacturing robot, which may be considered as a computer module, receives a large number of control signals per second, then an insufficient or excessively slow data transmission may lead to errors in the production process. Such a PLC controller may therefore be executed within the local, modular computer network EC and not via an external computer network, which may be a great distance away.

Figure 2:
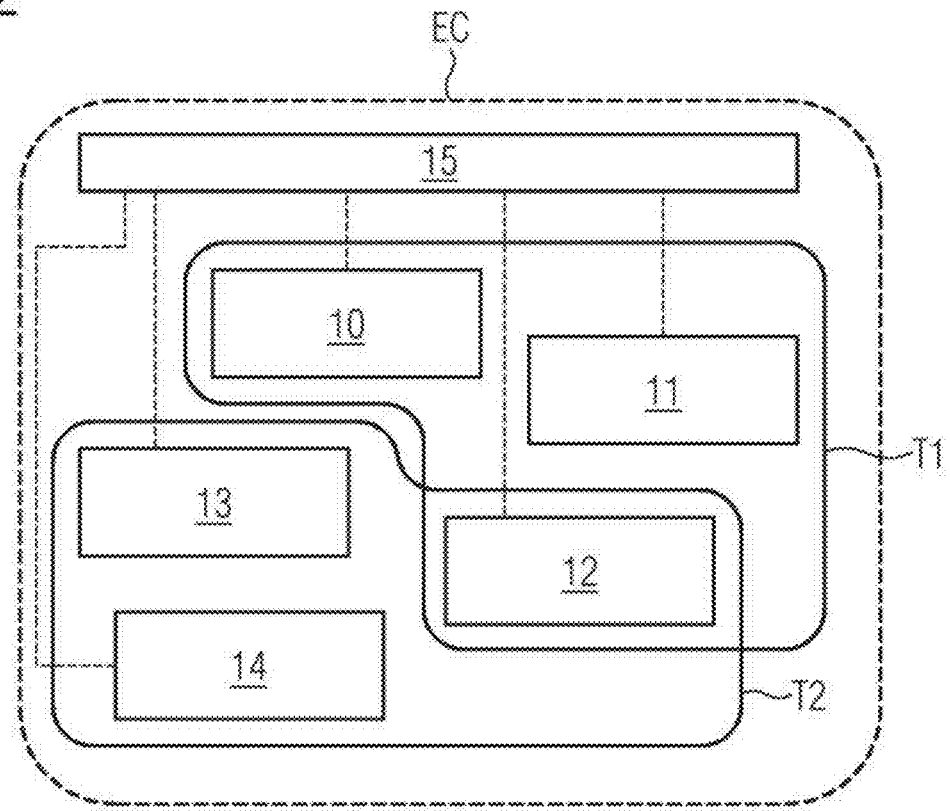
FIG. 2 depicts an example of two computer modules within the local, modular computer network having associated digital resources.

FIG. 2 schematically indicates the local, modular computer network EC having the computer modules T1 and T2 and their digital resources. The computer module T1 in this example includes a high computational power 10, a storage capacity 11 and industrial computers 12. This should however not be understood to mean that these digital resources 10, 11 and the industrial computers 12 represent the computer module T1. It should rather be understood thereby that the computer module T1 has access to these digital resources 10, 11 and to particular industrial computers 12.

In FIG. 2, the computer module T2 has access to further digital resources. The industrial computers 12 are likewise assigned to the computer module T2 in this example. That is to say, the computer modules T1 and T2 share the industrial computers 12 as digital resource. Mobile computer modules 13 and communication devices 14 are furthermore assigned to the computer module T2. FIG. 2 thus shows that the digital resources 10, 11, 14 are able to be described as the following main components: computational power 10, storage capacity 11, and communication capabilities 14. That is to say, the digital resources 10, 11, 14 may relate to different categories. Some of these resources relate to hardware, and others relate to communication.

The respective method acts may be stored in the image file. This image file contains an abstraction layer for the hardware. The image file may also be considered to be an operating system between the hardware and the provided services. The image file may therefore address a large number of computer modules and allocate their digital resources 10, 11, 14. In order to be able to correspondingly perform this task, the image file may in particular be provided with administration rights. This may also contain remote control access or remote access to a computer module.

By way of example, a camera unit may be addressed as computer module T1 in order to process an authentication request. The camera unit may therefore briefly require a higher computational power 10 or storage capacity. In this case, there may be provision, according to the commands that are stored in the image file, for the camera unit to be temporarily allocated more computational power 10 or storage capacity 11 for a particular time interval in order to perform the authentication request. That is to say, the assignment structure shown in FIG. 2 would change in this case. A particular assignment structure is therefore not stationary but may rather change in a flexible manner depending on a resource request. The image file may be executed or processed on an operating system or another virtual environment that supports container technologies (e.g., another virtualization including container technologies). A possible basic structure of such an operating system or virtual environment may in particular provide the following aspects.

The image file does not necessarily have to be produced in the vicinity of the associated computer module T1 or T2. The image file may in particular be produced or processed using a user-friendly program. This user-friendly program may be preconfigured and pre-installed. It is able to be changed if necessary and may create the image file when executed accordingly. In order to achieve this, it is advantageous for the respective computer modules T1 or T2 to retain information about their respective digital resources 10, 11, 14 in a manner able to be retrieved.

The image file may be independent of the configuration of the respective computer modules T1, T2 or else independent of the working area W1. It is likewise advantageous for the image file to be able to be transported easily or for it to be accessible from another network via a remote connection. This other network may also be an online store of a supplier. This supplier may be specially set up to distribute corresponding image files and have accordingly made the image files available for sale. That is to say, an image file may be purchased via an online store and then executed by the control unit 15 or by the external control unit 15'. The configuration of the digital resources 10, 11, 14 would therefore change within the local, modular computer network EC.

Figure 3:
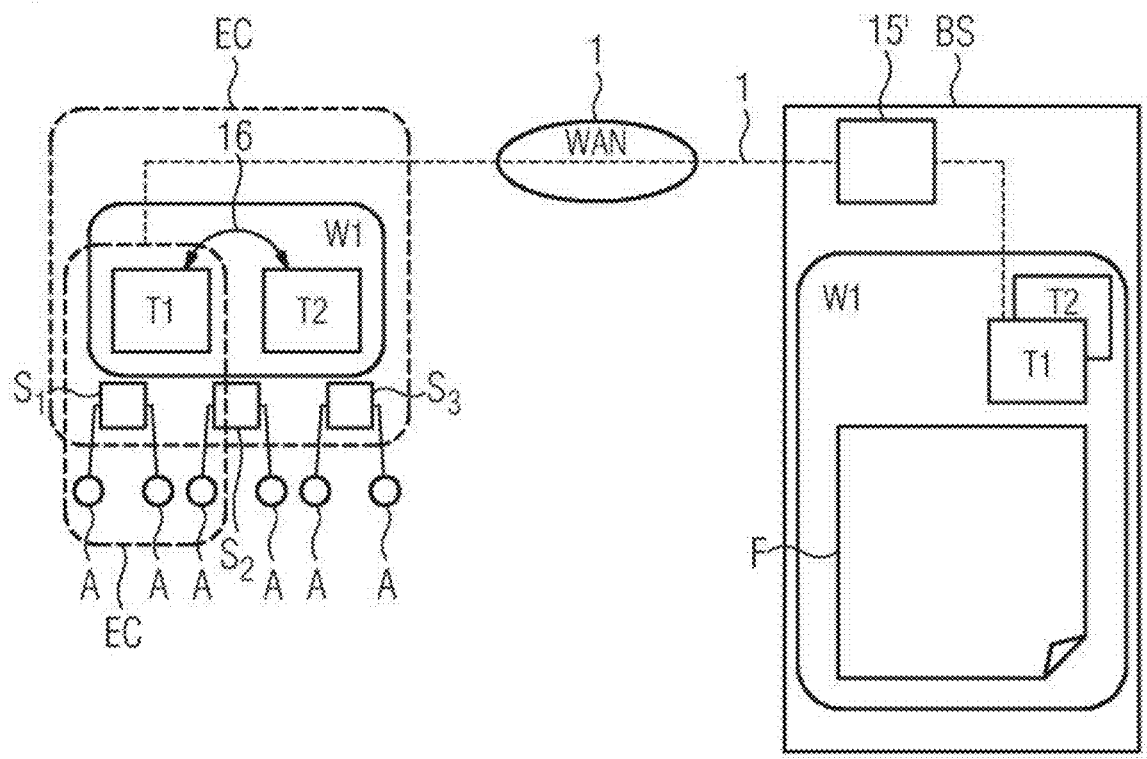
FIG. 3 depicts exemplary schematic sketches for illustrating the activation of a computer module with access to sensors and actuators.

FIG. 3 schematically indicates how the computer module T1 is addressed by the control unit 15'. The computer module T1 is preconfigured in the backend system BS. A communication connection between the backend system BS and the local, modular computer network EC is produced in this example via the WAN connection 1. The external control unit 15' executes the corresponding image file. This results in the computer module T1 being activated and the associated sensors S1, S2 and the corresponding actuators A being activated. At the same time, corresponding digital resources are assigned to the computer module T1, so that the computer module T1 is able to satisfy a requirement stored in the image file as intended. In this example, the local, modular computer network EC is queried in terms of its digital resources 10, 11, 14 by virtue of the execution of the image file by the external control unit 15'. The digital resource values and the required values are subjected to a comparison by the algorithm integrated in the image file. This comparison may contain a plurality of boundary conditions. On the basis of the result of this comparison, the digital resources 10, 11, 14 are reallocated by the external control unit 15'.

In the example of FIG. 3, the digital resources 10, 11, 14 are allocated by the control unit 15'. This constitutes remote access. It is however also possible for the control unit 15, which is part of the local, modular computer network EC, to allocate the digital resources 10, 11, 14. The image file may be activated automatically using a pre-manufactured program. The image file may however also be activated manually by an employee. If required, the content or the commands of the image file may in this case also be adapted. If necessary, the image file may set up a secure communication connection to external services. An additional program package that may be part of the image file may be accessed via this secure communication connection, for example, via an online store. The computer modules T1 and T2 may be addressed or activated via what are known as access points. Control signals of the control unit 15 or external control unit 15' are able to enter the operating system of the respective computer modules T1 and T2 via these access points or interfaces.

The control unit 15 or the external control unit 15' is thus also able to use external services via a remote connection and execute them within the local, modular network EC. It is thus possible to boot the local, modular computer network EC initially with a minimum number of services or functions F. If further resource requests are added, then the control unit 15 or the external control unit 15' is able to reallocate the digital resources 10, 11, 14 by way of the commands integrated in the image file. In addition to allocating digital resources 10, 11, 14, the control unit 15 or the external control unit 15' may also remove the digital resources 10, 11, 14 from the respective computer modules T1, T2 again. The allocation or removal of the digital resources 10, 11, 14 may be performed by a complex management service that is stored with corresponding commands in the image file. The image file may also be executed as a bootable script or as an executable file (for example, .exe file). At first use, the control unit 15 may initially detect the entire structure of the local, modular computer network EC by way of the bootable image file, as well as the associated computer modules T1, T2 and their digital resources 10, 11, 14. In the further process, it is possibly no longer absolutely necessary always to query and to detect the entire computer network EC.

In contrast to previously conventional edge cloud solutions from the IT sector, the present disclosure proposes to be able to flexibly reallocate and arrange the digital resources 10, 11, 14. A plurality of computer modules T1, T2 and so on form a heterogeneous pool of digital resources 10, 11, 14, which may be referred to as resource pool. Because each computer module T1 and T2 and so on may have various capabilities, it is highly advantageous not to confine their digital resources 10, 11, 14 to a rigid framework, but rather to allocate them flexibly depending on the resource request.

An advantage comes to the fore when computer modules T1, T2 or mobile computer modules 13 are taken into consideration. Mobile computer modules 13 may leave the detection area of the local, modular computer network EC and enter a new second local, modular computer network. Until now, no approach is known for being able to integrate mobile computer modules 13 that enter the detection area of the local, modular computer network EC. Mobile computer modules 13 may be self-driving robots, smartphones, motor vehicles or else ships.

Figure 4:
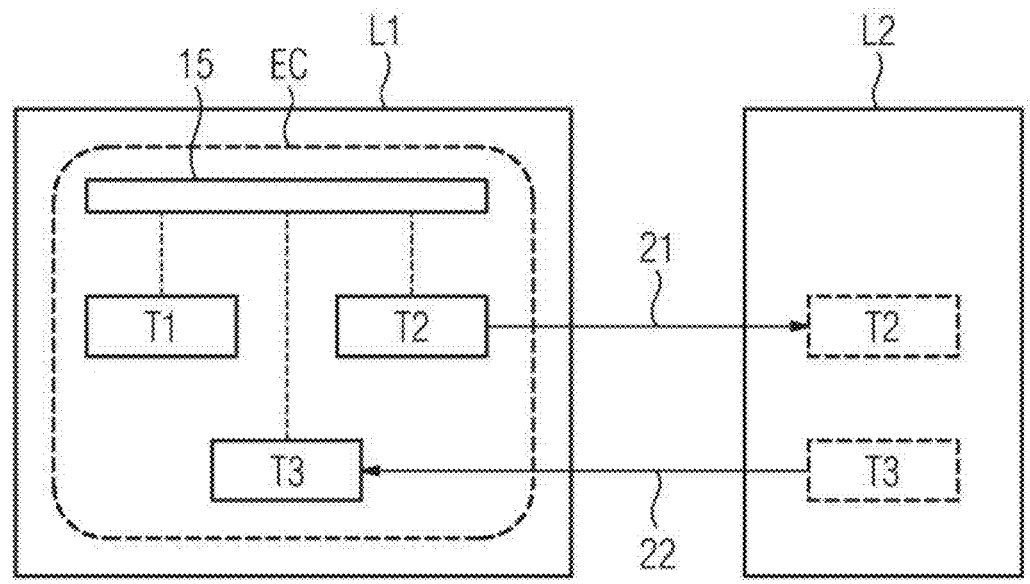
FIG. 4 depicts exemplary sketches of a local, modular computer network having mobile computer modules that leave or enter the network.

FIG. 4 shows two different spatial areas L1 and L2. The local, modular computer network EC is restricted to the spatial area L1. L2 no longer belongs to the computer network EC. In this example, the spatial area L1 is intended to be a harbor. The spatial area L2 represents, for example, a goods yard. The computer module T1 in this example is supposed to be a crane for lifting shipping containers. The computer module T2 in this example is intended to be a truck having a corresponding computer controller. The computer module T3 is a ship in this example. If this ship is at sea, then it is outside the spatial area L1. If this ship then travels via the path 22 into the harbor, then it thus reaches the active area of the local, modular computer network EC. In this case, the control unit 15 may integrate and receive the digital resources 10, 11, 14 of the ship into the local, modular computer network EC. It is thereby possible, when allocating the digital resources 10, 11, 14, to take into account the newly added resources of the ship. The control unit 15 likewise detects when the ship leaves the harbor again. In this case, the control unit 15 would register the fact that the digital resources of the ship are no longer available and may take this circumstance into account when allocating the digital resources 10, 11, 14. Likewise, the truck may leave the harbor area, in this case the spatial area L1, via the path 21. The truck, in this case the computer module T2, enters the spatial area L2, which is no longer part of the local, modular computer network EC, via the path 21. In this example, the spatial area L2 is a goods yard that is not connected to the local, modular computer network EC. That is to say, the computer modules 13 situated in the spatial area L2 and their digital resources 10, 11, 14 are no longer part of the local, modular computer network EC. If the ship has, for example, well-equipped computers 12 or servers and digital resources 10, 11, 14 are still available, then intensive data evaluation operations may temporarily be executed by way of the digital resources 10, 11, 14 of the ship, provided that the ship stays in the harbor, that is to say in the spatial area L1.

This may help to perform computational operations more quickly and more flexibly. That is to say, the local, modular computer network EC, unlike the previously known solutions and approaches, is not a rigid framework. Mobile computer modules 13 such as the ship may temporarily become part of the local, modular computer network EC and may thus add additional digital resources 10, 11, 14 into the local modular computer network EC. If this flexibility were not to be present, then the digital resources 10, 11, 14 of the ship may not be used. A situation whereby computer modules stop in the spatial area L1 and do not have their digital resources used is thereby able to be avoided.

The various spatial areas L1 and L2 may also be different factory halls. If a computer network includes just one factory hall and not the second one, then mobile robots may enter or leave the computer network. The present disclosure thus makes it possible for not only the digital resources 10, 11, 14 that are provided by stationary computer modules T1, T2, etc. to be used, but rather also for digital resources of mobile computer modules 13, etc. to be used as well.

It is thereby far more readily possible to tailor the local, modular computer network EC to the corresponding requirements. The mobile computer modules 13 may in this case be added or inserted into the local, modular computer network EC by the external control unit 15' as a remote connection, or by the control unit 15 in situ. At the same time, it is in this case also possible to take into account surroundings parameters in the process of allocating the digital resources 10, 11, 14. If, for example, it is intended to execute an extremely computationally intensive task, then there may be provision for the digital resources 10, 11, 14 only to be released if a personnel check has taken place beforehand by way of an authentication. That is to say, the identity of a person would be checked using a camera image, and the digital resources 10, 11, 14 may be released only in the event of a corresponding match. The incorporation or removal of mobile computer modules 13 into the local, modular computer network EC may be configured so as to be automatic. Corresponding instructions may be stored in the image file.

The image file may also store case discriminations and policies that relate to the allocation of the digital resources 10, 11, 14. Thus, for example, particular digital resources 10, 11, 14 may be provided as an emergency reserve that are not permitted to be allocated without further provisions.

By virtue of the flexible modular structure of the local, modular computer network EC, this computer network EC is able to be adapted easily. These dynamic adaptations may be stored in an image file as control commands. In this case, it is possible to access image files outside the local, modular computer network EC and use them within this computer network EC. The control unit 15 or external control unit 15' may in this case also under some circumstances set up a secure connection to an app store in order to retrieve a corresponding image file therefrom. A further advantage is that no specific operating system is required in this case. An adjustment may likewise also be performed by people who are not computer experts using user-friendly text editors or other programs. If the image file is configured at the same time as an executable boot file, then the local, modular computer network EC may be adapted independently of the configuration thereof. The present disclosure thus makes it possible to manage digital resources 10, 11, 14 within the local, modular computer network EC in a more flexible, more effective and more targeted manner. A situation whereby digital resources 10, 11, 14 remain unused in the case of mobile computer modules 13 is in particular able to be avoided. This may significantly increase effectiveness in the case of intensive data evaluation operations.

Although the disclosure has been illustrated and described in greater detail by the exemplary embodiments, the disclosure is not restricted by the disclosed examples and other variations may be derived herefrom by the person skilled in the art without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for allocating at least one digital resource of a local, modular computer network that has at least two computer modules, wherein each computer module of the at least two computer modules has a resource value for a digital resource assigned depending on an input dataset that has a resource request having a required value, the method comprising:
    accessing, by a control unit, the input dataset and reading the input dataset;
    retrieving, by the control unit, the resource value from each computer module that is part of the local, modular computer network, wherein each resource value represents an available proportion of the digital resource of the respective computer module;
    comparing, by the control unit, the required value with at least one of the retrieved resource values;
    allocating, by the control unit, at least one of the digital resources to the request depending on a result of the comparison; and
    automatically integrating, by the control unit, a mobile computer module into the local, modular computer network if when the mobile computer module enters a spatial area assigned to the local, modular computer network, and removing the mobile computer module when the mobile computer module leaves the spatial area.

2. The method of claim 1, wherein the method is executed automatically following activation of a digital image file by the control unit, wherein the digital image file stores instructions for the accessing, the retrieving, the comparing, the allocating, and the automatically integrating.

3. The method of claim 2, wherein the digital image file is created outside the local, modular computer network without using the control unit.

4. The method claim 3, wherein the created digital image file is made available to the control unit and the digital image file is executed within the local, modular computer network.

5. The method of claim 1, wherein the at least two computer modules are activated individually by the control unit and no signals that relate to the available proportions of the digital resources are exchanged between the at least two computer modules.

6. The method of claim 1, wherein the control unit executes the method in accordance with a provided policy that comprises a schedule for executing the accessing, the retrieving, the comparing, the allocating, and the automatically integrating.

7. A device for allocating digital resources of a local, modular computer network that has at least two computer modules, wherein each computer module of the at least two computer modules has a resource value for a digital resource assigned depending on an input dataset that has a resource request having a required value, the device comprising:
    a control unit configured to:
        access the input dataset and to read the input dataset;
        retrieve the resource value from each computer module that is part of the local, modular computer network, wherein the resource value represents an available proportion of the digital resource of the respective computer module;
        compare the required value with at least one of the retrieved resource values;
        allocate at least one of the digital resources to the request depending on a result of the comparison; and
        automatically integrate a mobile computer module into the local, modular computer network when the mobile computer module enters a spatial area assigned to the local, modular computer network, and to remove the mobile computer module when the mobile computer module leaves the spatial area.

8. The device of claim 7, wherein one computer module of the at least two computer modules is coupled to a sensor unit via a communication connection,
    wherein the sensor unit is configured to record a surroundings parameter.

9. The device of claim 8, wherein the control unit is configured to allocate the at least one digital resource depending on the surroundings parameter.

10. The device of claim 7, wherein the at least two computer modules provide a heterogeneous computer network.

11. The device of claim 7, wherein the at least two computer modules are arranged in the spatial area assigned to the local, modular computer network.

12. The device of claim 7, wherein each computer module of the at least two computer modules has an interface for communicating with one or more computer modules.

13. The device of claim 7, wherein the local, modular computer network has an at least partly wired communication connection to a further external control unit.

* * * * *

UNITED STATES PATENT AND TRADEMARK OFFICE
CERTIFICATE OF CORRECTION

PATENT NO. : 11,271,990 B2  
APPLICATION NO. : 16/611782  
DATED : March 8, 2022  
INVENTOR(S) : Reinhard Frank Page 1 of 1

It is certified that error appears in the above-identified patent and that said Letters Patent is hereby corrected as shown below:

In the Claims (Claim 1; Column 15, Line 39):
"network if when the mobile computer module enters a"

Should be replaced with:
"network when the mobile computer module enters a"

Signed and Sealed this  
Twenty-sixth Day of April, 2022

Katherine Kelly Vidal  
*Director of the United States Patent and Trademark Office*